United States Patent
Bennett et al.

(10) Patent No.: US 6,696,165 B1
(45) Date of Patent: Feb. 24, 2004

(54) STYRENE COPOLYMER COMPOSITIONS HAVING REDUCED SURFACE GLOSS AND COMPOSITE ARTICLES INCORPORATING SAME

(75) Inventors: James H. Bennett, Livonia, MI (US); Klaus Mühlbach, Grünstadt (DE); Gary Kogowski, Farmington Hills, MI (US); Heiner Görrissen, Ludwigshafen (DE); Graham Edmund Mc Kee, Neustadt (DE)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/582,545

(22) PCT Filed: Dec. 18, 1998

(86) PCT No.: PCT/EP98/08361

§ 371 (c)(1),
(2), (4) Date: Jun. 28, 2000

(87) PCT Pub. No.: WO99/33914

PCT Pub. Date: Jul. 8, 1999

(30) Foreign Application Priority Data

Dec. 29, 1997 (US) ......................... 08/999,270

(51) Int. Cl.$^7$ ................... B32B 27/30; C08L 51/04
(52) U.S. Cl. ................. 428/474.4; 428/475.5; 428/480; 428/521; 428/522; 428/523; 525/64; 525/66; 525/166; 525/176; 525/177; 525/179; 525/183; 525/184
(58) Field of Search ................ 525/64, 66, 166, 525/176, 177, 179, 183, 184; 428/474.4, 475.5, 480, 521, 522, 523

(56) References Cited

U.S. PATENT DOCUMENTS

| | | | |
|---|---|---|---|
| 4,169,869 A | * 10/1979 | Millenius | 525/87 |
| 4,861,817 A | 8/1989 | Erpelding et al. | |
| 4,894,416 A | * 1/1990 | Gallucci | 525/74 |
| 5,026,777 A | * 6/1991 | Jalbert | 525/65 |
| 5,183,840 A | 2/1993 | Erpelding et al. | |
| 5,270,386 A | * 12/1993 | Laughner | 525/66 |
| 5,306,548 A | * 4/1994 | Zabrocki | 428/215 |
| 5,837,772 A | * 11/1998 | Mc Kee | 525/66 |

FOREIGN PATENT DOCUMENTS

| | | | |
|---|---|---|---|
| DE | 195 095 14 | * | 9/1996 |
| EP | 269027 | | 6/1988 |
| GB | 2171705 | | 2/1985 |
| JP | 2-22356 | * | 1/1990 |

OTHER PUBLICATIONS

Chemical Abstract of JP 2022356 A. PCT International Preliminary Examination Report Dated Apr. 5, 2000.

* cited by examiner

Primary Examiner—Patricia A. Short (57) ABSTRACT

The invention provides a weatherable low gloss styrene copolymer composition which requires the addition of from 0.1 to 20% by weight of the total composition, of a partially crystalline polymer such as a polyalkylterephthalate, especially polybutyleneterephthalate or polyethyleneterephthalate, or polyethylenenaphthalate to a styrene copolymer (A). The low gloss styrene copolymer composition of the invention has a graft copolymer resin which results from polymerizing one or more monomers (A1) selected from the group consisting of (i) aromatic vinyl compounds, (ii) ethylenically unsaturated compounds, and (iii) mixtures thereof, in the presence of an elastomeric rubber (A2) in particulate form. The elastomeric rubber (A2) in particulate form results from polymerizing one or more monomers selected from the group consisting of (i) alkyl acrylates having from 1 to 8 carbon atoms, (ii) butadiene, (iii) olefin compounds, (iv) ethylenically unsaturated compounds, (v) aromatic vinyl compounds, (vi) polyfunctional monomers having a crosslinking effect, and (vii) mixtures thereof. The invention further provides a method of reducing the surface gloss of a styrene copolymer resin by adding to a styrene copolymer resin (A), from 0.1 to 20% by weight of a partially crystalline polymer such as a polyalkylterephthalate (B), based on the total weight of the composition. The invention also provides a composite suitable for use as exterior siding for a structure, the composite comprising at least one interior layer (I) comprising a thermoplastic resin, and at least one exterior layer (II) having a low gloss styrene copolymer comprising the low gloss styrene copolymer composition of the invention, wherein exterior layer (II) is continuos and coextensive with interior layer (I).

12 Claims, 2 Drawing Sheets

STYRENE COPOLYMER COMPOSITIONS HAVING REDUCED SURFACE GLOSS AND COMPOSITE ARTICLES INCORPORATING SAME

This invention relates to styrene copolymer compositions having reduced surface gloss, a method of reducing the surface gloss of a styrene composition, composite articles incorporating such compositions, and a process for preparing said composite articles. More particularly, this invention relates to weatherable styrene copolymer compositions, especially acrylonitrile-styrene-acrylate ("ASA") compositions, having reduced surface gloss, and to multi-layer composites incorporating said compositions. The composites are useful as siding materials for the building and construction industry.

Two phase styrene copolymer resins composed of a resin matrix and an elastomeric or rubber component are known to provide a number of useful properties. Illustrative examples are ASA, olefin-styrene-acrylonitrile (OSA) or acrylonitrile-EPDM-styrene resins (AES), and acrylonitrile-butadiene-styrene (ABS). These resins find use in a variety of applications in the building and construction markets (home and commercial siding, window and door profiles, gutters), in leisure and recreation applications (spas, marine components, outdoor furniture, snowmobile components, recreational vehicles, motor homes, campers, etc) and in the automotive industry (body side moldings, bumpers, interior trim, and mirror housings).

Depending on the particular resin and elastomeric compositions, various performance characteristics are possible. For example, ABS resins generally provide excellent low temperature impact resistance and processability. ASA and AES resins are particularly known for desirable impact strength, processability and weather resistance, that is, good color and property retention after long outdoor exposure. Articles extruded of ABS, AES or ASA generally exhibit a surface gloss falling within the high gloss (90 gloss units at 75°) range or medium gloss (60 gloss units at 75°) range.

The prior art has long desired to provide styrene copolymer resins and/or compositions which possess the foregoing advantageous physical and performance characteristics but exhibit a low gloss surface appearance. In particular, it would be advantageous to provide ABS, AES and ASA compositions, especially ASA compositions, having low gloss and desirable performance properties.

Such compositions would be of benefit in the construction industry, especially with respect to the manufacture of siding.

Prior art attempts to provide styrene copolymer compositions having a reduced surface gloss have included the embossing of mold surfaces and the application of a low gloss coating material to the surface of a molded plastic article. These methods failed to provide a sufficient reduction in surface gloss and were disadvantageous with respect to processing, cost and/or performance considerations.

Several other prior art attempts have focused on the addition or modification of a particular rubber or elastomeric component.

U.S. Pat. No. 5,081,193 discloses a low gloss agent for thermoplastic resins comprising a grafted copolymer containing a rubber component, especially a low-cis polybutadiene.

U.S. Pat. No. 5,237,004 discloses thermoplastic polymer compositions having reduced surface gloss due to the presence of polymer particles of from 2 to 15 micrometers and having a particular core/shell structure.

U.S. Pat. No. 5,475,053 discloses molding compositions having a matte surface comprising an impact modified thermoplastic A and a matting agent B. The thermoplastic resin A can be ABS, ASA or the like. Matting agent B is a particular graft copolymer having from 30 to 80 of a particularly specified elastomeric grafting base and from 20 to 70% of a particularly specified graft sheath.

U.S. Pat. No. 4,652,614 discloses moulding materials having a mat surface which are based on neutral and acid graft polymers.

U.S. Pat. No. 4,169,869 discloses ABS compounds having a low gloss or mat finish. The claimed compositions are obtained by including polybutadiene and a copolymer of butadiene and acrylonitrile in ABS.

U.S. Pat. No. 4,668,737 discloses graft polymers having a mat surface. The claimed polymers require from 20 to 0.1 parts by weight of a vinyl-group containing, preferably heterocyclic nitrogen base, from 40 to 99.8 parts by weight of particular vinyl aromatic monomers, from 20 to 0.1 parts by weight of a mono- or di-acid containing a polymerizable double bond and from 0 to 40 parts by weight of acrylonitrile on a particulate rubber having an average particle diameter of from 0.05 to 20.0 micrometers and a glass temperature of less than or equal to 10 degrees C., the total rubber content amounting to between 5 and 80% by weight.

However, the foregoing prior art attempts have generally been characterized by one or more disadvantages, especially with respect to the adequacy of surface gloss reduction, quality of surface appearance, cost considerations, ease of manufacturing, ease of processing, and/or the performance properties of the compositions.

Accordingly, it would be advantageous to provide a method for reducing the surface gloss of styrene copolymer compositions, particularly with respect to molded articles made of such styrene compositions, especially ASA.

It would be desirable to provide styrene copolymer compositions, especially ASA compositions, which exhibit desirable performance properties, a reduction in surface gloss as compared to traditional styrene copolymer compositions, advantageous cost considerations, and ease of manufacturing and/or processing.

It would also be desirable to provide composite structures incorporating such low gloss styrene compositions, especially ASA compositions, which are suitable for use as siding, as well as a method for the manufacture of such composites.

It is an object of this invention to provide styrene copolymer compositions, especially ASA compositions, which exhibit a reduced surface gloss when processed.

It is another object of this invention to provide a method for reducing the surface gloss of commercially available styrene copolymer compositions. In particular, it is an object of this invention to provide a method of reducing the surface gloss of commercially available styrene copolymer compositions, especially ASA compositions, which is advantageous with respect to cost and ease of manufacturing.

Finally, it is an object of the invention to provide a composite incorporating the foregoing low gloss styrene copolymer compositions as an exterior layer and a method of making such composites. In particular, it is an object of the invention to provide low gloss styrene copolymer compositions, especially low gloss ASA compositions, which can be used in the manufacture of low gloss, weatherable exterior siding composite structures and to a method of manufacturing such siding composites.

This invention satisfies the foregoing objects and more by providing a particular low gloss styrene copolymer composition which requires the addition, preferably from 0.1 to 20% by weight of the total composition, of a partially crystalline polymer as mating agent. In one aspect of the invention a polyalkyleneterephthalate, or a mixture of different polyalkyleneterephthalates especially polybutyleneterephthalate or polyethyleneterephthalate are used as matting agent. Instead of a polyalkyleneterephthalate a polyalkylenenaphthalate or a mixture thereof may also be used as matting agent. It is also possible to employ a mixture of different polyalkylenenaphthalates. Among the polyalkylene naphthalates polyethylene naphthalate is preferred. According to another aspect of the invention polyamide, polyamide copolymers or a mixture of different polyamides or polyamide copolymers can be used as matting agent. The low gloss styrene copolymer composition of the invention has a graft copolymer resin (A) which results from polymerizing one or more monomers (A1) selected from the group consisting of (i) aromatic vinyl compounds, (ii) ethylenically unsaturated compounds, and (iii) mixtures thereof, in the presence of an elastomeric rubber (A2) in particulate form. The elastomeric rubber (A2) in particulate form results from polymerizing one or more monomers selected from the group consisting of (i) alkyl acrylates having from 1 to 32, preferably 1 to 8 carbon atoms, (ii) butadiene or isoprene, (iii) olefin compounds (other than ii), (iv) ethylenically unsaturated compounds, (v) aromatic vinyl compounds, (vi) polyfunctional monomers having a crosslinking effect, and (vii) mixtures thereof. The low gloss thermoplastic resin compositions of the invention require from 0.1 to 20% by weight of the matting agent (B), all percents by weight being based on the total weight of the composition.

The invention further provides a method of reducing the surface gloss of a styrene copolymer resin by adding to a styrene copolymer resin (A), from 0.1 to 20% by weight of the matting (B), based on the total weight of the composition, preferably at temperatures from about 20° C. below the melting point of (B) to temperatures above the melting point of (B).

Finally, the invention also provides a composite suitable for use as exterior siding for a structure, the composite comprising at least one interior layer (I) comprising a thermoplastic resin, and at least one exterior layer (II) having a low gloss styrene copolymer comprising the foregoing copolymer (A) and from 0.1 to 20% by weight of the matting agent (B), all percents by weight being based on the total weight of the composition, wherein exterior layer (II) is continues and coextensive with interior layer (I).

In one aspect in it's most preferred embodiment, the present invention is intended to provide a low gloss styrene copolymer composition comprising a styrene copolymer (A) and a polyalkyleneterephthalate or a polyalkylenenaphthalate (B). In another aspect in it's most preferred embodiment, the present invention is intended to provide a low gloss styrene copolymer composition comprising a styrene copolymer (A) and a polyamide or a polyamide copolymer (B).

As used herein, the term "low gloss" refers to a surface gloss measurement falling within the range of from 15 to 45 gloss units as measured by a BYK/Gardner glossmeter at 75°. Gloss is typically measured on extruded monolayer styrene copolymer or coextruded sheets having an outer layer of styrene copolymer, the thickness of the styrene copolymer in either case generally ranging from 5 to 50 mils (0.127 to 1.27 mm).

Styrene copolymer as used herein generally refers to polymer compositions or resins resulting from the polymerization or copolymerization of at least one vinyl aromatic monomer. Preferably, the at least one vinyl aromatic monomer will be copolymerized with a vinyl cyanide. Most preferably, all or a part of the at least one vinyl aromatic monomer and the at least one vinyl cyanide will be copolymerized in the presence of a elastomeric or rubber component. The styrene copolymers suitable as component (A) of the invention are preferably graft copolymers. Most preferably, the graft copolymers will have a core/shell structure. Preferably the styrene copolymer (styrene resin (A)) will contain certain rubber particles (A2) grafted with one or more monomers (A1). In some cases, the at least one vinyl aromatic monomer and the at least one vinyl cyanide will be copolymerized in the presence of a linear polyalkyldiene. Preferably this graft shell of the rupper particles will be formed by polymerizing styrene and acrylonitrile in the presence of the rubber. Likewise suitable as component (A) are mixtures of graft copolymers and polymers or copolymers of at least one vinyl aromatic monomer and at least one vinyl cyanide monomer (A3). This mixture can either be prepared by mixing of graft copolymer with (A3) or is formed in situ. The latter is the case not all of the vinyl aromatic and vinyl cyanide monomers are grafted onto the elastomeric or rubber component.

Styrene resin (A) will generally result from the polymerization or copolymerization of at least one monomer (A1). Monomers (A1) may generally be those monomers used in the production of styrene copolymers. Such monomers are typically described as (i) aromatic vinyl compounds, (ii) ethylenically unsaturated compounds, and/or (iii) mixtures thereof.

Illustrative examples of aromatic vinyl compounds (i) are styrene, α-methylstyrene, o-methylstyrene, p-methylstyrene, m-methylstyrene, p-methylstyrene, 1,3-dimethylstyrene, tertbutylstyrene, vinylnaphthalene, and the like. Preferred aromatic compounds (i) are styrene, α-methylstyrene, p-methylstyrene and tertbutylstyrene. Most preferred aromatic compounds (i) are styrene and α-methylstyrene.

Illustrative examples of ethylenically unsaturated monomers (ii) are compounds such as vinyl cyanides such as acrylonitrile, methacrylonitrile, alkylacrylates and alkylmethacrylates having from 1 to 4 carbon atoms in the alkyl moiety, acrylic acid, methacrylic acid, maleic anhydride, acrylamide, and/or vinyl methyl ether. Preferred ethylenically unsaturated monomers (ii) are vinyl cyanides such as acrylonitrile.

When styrene resin (A) results solely from the polymerization or copolymerization of one or more monomer(s) (A1), the amounts of monomers (i) and/or (ii) are dependent upon the desired properties of resin (A). However, it is most preferred that one or more monomer (A1) contain at least one monomer which is an aromatic vinyl compound (i). Preferably, one or more monomer (A1) will have at least 20 weight % of an aromatic vinyl compound (i), based on the total weight of one or monomer (A1). Most preferably, one or more monomer (A1) will have from 30 to 85, preferably from 30 to 75 weight percent of aromatic vinyl compound (i).

Monomers (A1) may be polymerized by traditional processes known to those skilled in the art. Polymerization may be carried out in mass, solution, suspension, or aqueous emulsion. Free radical polymerization is preferred, especially when (A) is SAN and monomers (A1) are styrene and acrylonitrile.

Styrene resin component (A) may also be a graft copolymer resin such as are well known in the art. An illustrative example is disclosed in U.S. Pat. No. 4,634,734, hereby incorporated by reference in its entirety.

For example, resin (A) may comprise the result of polymerizing one or more monomers (A1) in the presence of an elastomeric rubber (A2). Elastomeric rubber (A2) may also be referred to as a grafting base. It will be appreciated that a great variation in the performance properties of resin (A) may be obtained depending upon the selection of rubber or grafting base (A2).

Examples of suitable rubbers (A2) are polybutadiene, polyisoprene, styrene-butadiene copolymers, acrylonitrile-butadiene copolymers, alkylacrylate rubbers, EPM rubbers (ethylene/propylene rubbers), EPDM rubbers (ethylene/propylene/diene rubber containing a non-conjugated diene, such as for example 1,5-hexadiene or norbornadiene, in small quantities as the diene,) and silicone rubbers.

Those skilled in the art will appreciate that elastomeric rubber (A2) may result from the polymerization or copolymerization of one or more monomers (A2') selected from the group consisting of (i) alkyl acrylates having from 1 to 8 carbon atoms in the alkyl group, (ii) a 1,3 diene, (iii) olefin compounds, (iv) ethylenically unsaturated compounds, (v) aromatic vinyl compounds, (vi) polyfunctional monomers having a crosslinking effect, and (vii) mixtures thereof.

Rubber (A2) may result from the polymerization or copolymerization of one or more monomers (A2') selected from the group of (i) alkyl acrylates having from 1 to 8 carbon atoms in the alkyl group. Preferred are alkyl acrylates having from 4 to 8 carbons in the alkyl moiety. Most preferred examples are n-butyl acrylate and ethylhexyl acrylate. Monomer (A2') can be one or more alkyl acrylates alone or in admixture with one another. Suitable alkyl acrylates may also be mixed with suitable monomers selected from monomers (ii)–(vi) described herein.

One or monomers (A2') may also be selected from the group consisting of 1,3 dienes (ii). Illustrative examples are butadiene, isoprene, and the like. The 1,3-dienes may be used alone, in admixture with other 1,3 dienes, or mixed with other suitable monomers selected from monomers (i) and/or (iii)–(vi) described herein. For example, it will be appreciated that when resin (A) is an ABS resin, rubber (A2) may be a conjugated diolefin polymer latex such as polybutadiene or an elastomeric butadiene copolymer of butadiene-styrene, butadiene-acrylonitrile, butadiene-alkyl acrylates, and the like.

Monomers (A2') may also be one or more olefins (iii). Illustrative examples of olefins (iii) are those aliphatic compounds having from two to 4 carbons such as ethylene, propylene, butylene and the like. Preferred are ethylene and propylene. Olefins (iii) may be used alone as monomer (A2') or in admixture with each other or mixed with one or more other monomers selected from monomers (i)–(ii) and/or (iv)–(vi).

Monomers (A2') may be selected from monomers which are ethylenically unsaturated compounds (iv). Ethylenically unsaturated compounds suitable for use as monomer (iv) and hence monomer (A2') are those as described above with respect to monomers suitable for use as one or more monomers (A1) (ii). Other illustrative examples include hydroxyalkyl acrylates or methacrylates. Preferred hydroxalkyl acrylates/methyacrylates are those having from 2 to 6 carbon atoms in the alkyl moiety. One or more of the monomers (A2') may be an ethylenically unsaturated compound alone, or in admixture with another ethylenically unsaturated compound, or an ethylenically unsaturated compound mixed with one or more other monomers selected from monomers (i)–(iii) and/or (v)–(vi).

One or monomers (A2') may also be selected from aromatic vinyl compounds (v). Aromatic vinyl compounds suitable for use as monomers (v) and hence one or monomers (A2') are those described above with respect to monomers (A1)(i). Styrene is particularly preferred for use as a monomer (v). One or more of the monomers (A2') may be an aromatic vinyl compound alone, or in admixture with another aromatic vinyl compound, or an aromatic vinyl compound mixed with one or more other monomers selected from monomers (i)–(iv) and/or (vi).

Monomers suitable for use as polyfunctional monomers (vi) having a crosslinking effect are those which contain at least two double bonds capable of copolymerization. Examples are divinylbenzene, diallyl maleate, diallyl fumarate, diallyl phthalate, allyl methacrylate, butanediol diacrylate, hexanediol diacrylate, butadiene, isoprene, triallyl cyanurate and triallyl isocyanurate. A preferred monomer (vi) is the acrylic ester of tricyclodecenyl alcohol.

Elastomeric rubber (A2) may be made by polymerization processes known to those skilled in the art. Such processes include emulsion polymerization and bulk or solution polymerization followed by emulsification of the resulting polymers. An illustrative example of emulsion polymerization is described in U.S. Pat. No. 5,252,666 and in DE 12 60 135, both of which are incorporated by reference in their entirety herein.

It will be appreciated that graft copolymers suitable for use in this invention may, and preferably will have, a core/shell structure. Such structures are described in U.S. Pat. No. 5,252,666. It will be appreciated that the foregoing rubber (A2) will generally form the core. The surrounding core may be formed by the polymerization of the monomers (A1) or the like in the presence of the elastomeric rubber (A2). Such processes are further described in U.S. Pat. No. 5,252,666.

A most preferred rubber will have a weight average particle size of from 50 to 600 nm.

The polymer surrounding the core/shell particles will generally be surrounded by a polymer matrix, typically a rigid copolymer. Those skilled in the art will appreciate that such may comprise the polymerized free ungrafted monomers (A1) resulting from the polymerization of monomers (A1) in the presence of elastomeric core (A2) and the production of the desired core/shell structure. Alternatively, resin (A) may be formed from the mixing of separately prepared polymer or copolymer (A3) with either elastomeric rubber (A2) or the result of polymerizing monomers (A1) in the presence of elastomeric rubber (A2), i.e., graft copolymers having a core/shell structure.

Copolymer (A3) will generally result from the polymerization or copolymerization of one or more monomers such as those described above with respect to monomers (A1). Styrene, alpha methyl styrene, and acrylonitrile are preferred, with mixtures of styrene and acrylonitrile being most preferred. (A3) may be a mixture of copolymers, e.g. styrene-acrylonitrile copolymer with α-methylstyrene-acrylonitrile copolymer. Copolymer (A3) will generally have from 20 to 50 percent by weight of monomers (A1) (ii), based on the weight of copolymer (A3). Monomers (A1) (ii) will preferably be present in an amount of from 10 to 94, such as 35 to 94 preferably 10 to 90 percent by weight, based on the weight of the total composition of (A1), (A2), and (A3).

Copolymer (A3) may thus be a styrene/acrylonitrile copolymer, an alpha methylstyrene/acrylonitrile copolymer, a styrene/methylmethacrylate copolymer, a styrene/maleic anhydride copolymer or an alpha-methylstyrene/styrene/ acrylonitrile-, a styrene/acrylonitrile/methylmethacrylate-, styrene/acrylonitrile/maleic anhydride or a styrene/ acrylonitrile/acrylic acid terepolymer, or an alphamethylstyrene/styrene/acrylonitrile terepolymer or mixtures thereof. If copolymer (A3) consists of mixtures of the above, the acrylonitrile content of the various copolymers containing acrylonitrile should preferably not differ from each other by more than 10 percent by weight, most preferably by not more than 5 percent by weight based on the copolymer.

Most preferably, copolymer (A3) will be a styreneacrylonitrile SAN resin or an α-methylstyrene-acrylonitrile resin or mixtures thereof. Suitable SAN copolymers are those discussed above with respect to copolymer (A1). A commercially available SAN resin suitable for use in the instant invention as component (A3) is LURAN® SAN resin, available from BASF Corporation, Wyandotte, Mich. Particularly suitable and preferred commercially available materials are LURAN® SAN resin grades 358N, 368R, 378P, and 388S. These are characterized by their content of styrene, α-methylstyrene and/or substituted styrenes of from 50 to 100, preferred 60 to 95, especially preferred 60 to 90% by weight, based on the SAN. Their (meth)acrylonitrile content can be up to 42%, preferably from 5 to 40, in particular from 7 to 38% by weight, based on the SAN. The remaining portions can be $C_1$- to $C_8$-alkylesters of (meth) acrylic acid, maleinimide, N-methyl-N-phenyl- or N-cyclohexylmaleinimide or maleic anhydride. Their viscosity numbers are generally from 40 to 160, preferably from 45 to 120 ml/g (as measured according to DIN 53 726 at 25° C. in 0.5% by weight in dimethylformamid), corresponding to a molecular weight ($M_w$) of from 40 000 to 200 000 g/mol.

Polymerization processes such as those described above with respect to the polymerization of monomers (A1) are suitable for the production of copolymer (A3). Generally, copolymers (A3) will have viscosity numbers of from 40 to 100, particularly of 50 to 90.

If copolymer (A3) does not result from the polymerization of monomers (A1) in the presence of elastomeric rubber (A2), copolymer (A3) may be incorporated with the result of polymerizing monomers (A1) in the presence of elastomeric rubber (A2), by processes known to those skilled in the art. Copolymer (A3) may be mixed all at once with the result of polymerizing monomers (A1) and (A2'), or may be mixed in smaller portions.

Traditional compounding techniques, such as extrusion compounding using single or twin screw extruders may be used. For example, one preferred method is to intensively mix a melt of the copolymer (A3) with the result of copolymerized graft copolymer of (A1) and (A2) at temperatures above 200° C. Alternatively, if the various copolymer components were prepared by emulsion polymerization, the resultant polymer dispersions can be mixed and the polymer mixture processed. Preferably, copolymer (A3) will be mixed with the graft copolymer of (A1) and (A2) by combined extrusion, kneading or rolling of the components.

Those skilled in the art will appreciate that prior to this it is necessary to isolate the components from the solution or aqueous dispersion resulting from the polymerization. Partial dewatering of the grafting copolymerization products obtained in an aqueous dispersion, i.e., graft copolymer of (A1) on (A2), is also possible and can be mixed with copolymer (A3) as damp crumbs with complete drying of the copolymerized graft copolymer mixtures taking place during the mixing process.

Styrene copolymer resin (A) may additionally contain additives such as are commonly included for styrene copolymer resins. Examples include fillers, other compatible plastics, antistatics, antioxidants, flame retardents, and lubricants. Such additives are commonly used in amounts of from 0.1 to 70 parts by weight based on 100 parts by weight of the resin (A), or (A1)+(A2)+(A3). In addition, dyes and pigments may be incorporated into resin (A) in amounts of from 0.02 to 10 parts by weight, based on the weight of resin (A).

While resin (A) may be any of the styrene copolymer resins discussed above, i.e., SAN, ASA, ABS, AES, or the like, it is preferred that resin (A) be SAN, ABS, or ASA. Most preferably, resin (A) will be ASA. An illustrative and suitable resin (A) may have an elastomeric phase (A2) of butylacrylate and tricyclodecenylacrylate and is grafted with (A1) styrene and acrylonitrile in a ratio of 75 to 25 and is mixed with a styrene/acrylonitrile copolymer or α-methylstyrene-acrylonitrile copolymer (A3) having an acrylonitrile content of 22 to 35 percent.

Particularly suitable and commercially available ASA resins suitable for use in the instant invention as resin (A) are the LURAN® S ASA resins, available from BASF Corporation, Wyandotte, Mich. A most preferred resin (A) is LURAN® S ASA resin grade 797 SE UV.

According to the invention the matting agent (B) is a partially crystalline polymer. Among these partially crystalline polyesters, polyamides or copolymers thereof may be used as component (B). Mixtures of different partially crystalline polymers may also be employed as matting agent (B).

According to one aspect of the invention component (B) is a polyalkyleneterephthalate or polyalkylenenaphthalate having an alkyl group of from 2 to 10 in particular 2 to 4 carbon atoms. Polybutyleneterephthalate and polyethyleneterephthalate and polyethylenenaphthalate are most preferred. It is of course also possible to use mixtures of different polyalkyleneterephthalates or polyalkylenenaphthalates as well as mixtures of one or more polyalkyleneterephthalates and polyalkylenenaphthalates. The polyalkyleneterephthalates or polyalkylenenaphthalates may also contain units derived from isophthalic acid. Up to 30 mol-%, preferably not more than 10 mol-%, of the aromatic dicarboxylic acid units may be replaced by aliphatic or cycloaliphatic dicarboxylic acid units, such as units derived from adipic acid, azaleic acid, sebacic acid, dodecanedivic acids or cyclohexanedicarboxylic acids.

The alkylene units may be derived from diols in particular 1,2-ethanediol, 1,4-butanediol, 1,6-hexanediol, 1,4-hexanediol, 1,4-cyclohexanediol, 1,4-cyclohexanedimethylanol or neopentylglycol or mixtures of these.

Suitable polyalkyleneterephthalates or polyalkylenenaphthalates will have a viscosity number determined according to ISO 1628-5 in phenol/1,2-dichlorobenzene (1/1) of 50–200 ml/g, preferably 70–170 ml/g and most preferably between 90–140 ml/g. The polyalkyleneterephthalates or polyalkylenenaphthalates will preferably be unfilled. Illustrative of commercially available polyalkyleneterephthalates suitable for use as component (B) are the ULTRADUR polybutyleneterephthalate resins available from BASF Corporation, Wyandotte, Mich. A most preferred component (B) is ULTRADUR® resin grade B2550.

According to another aspect of the invention the matting agent B may be a polyamide or a mixture of different polyamides. One of the preferred polyamides is polyamide 6.6. In particular B is a partly aromatic copolyamide or a mixture of two or more different partly aromatic copolyamides.

The partly aromatic copolyamides B) present in the styrene copolymer compositions according to the invention contain as component $B_1$) 20–90% by weight of units derived from terephthalic acid and hexamethylenediamine. A small proportion of terephthalic acid, preferably not more than 10% by weight of the total aromatic dicarboxylic acids used, can be replaced by isophthalic acid or other aromatic dicarboxylic acids, preferably by those where the carboxyl groups are para-disposed.

Besides the units derived from terephthalic acid and hexamethylenediamine, copolyamides B) contain as component $B_2$) units derived from ε-caprolactam and/or contain as component $B_3$) units derived from adipic acid and hexamethylenediamine.

The proportion of units derived from ε-caprolactam is not more than 50% by weight, preferably 20–50% by weight, in particular 25–40% by weight, while the proportion of units derived from adipic acid and hexamethylenediamine is up to 80% by weight, preferably 30–75% by weight, in particular 35–65% by weight.

Copolyamides B) may also contain units not only of ε-caprolactam but also of adipic acid and hexamethylenediamine; in this case, it is an advantage for the proportion of units which are free of aromatic groups to be not less than 10% by weight, preferably not less than 20% by weight. The ratio of units derived from ε-caprolactam and units derived from adipic acid and hexamethylenediamine here is not subject to any particular restriction.

Figure 2:
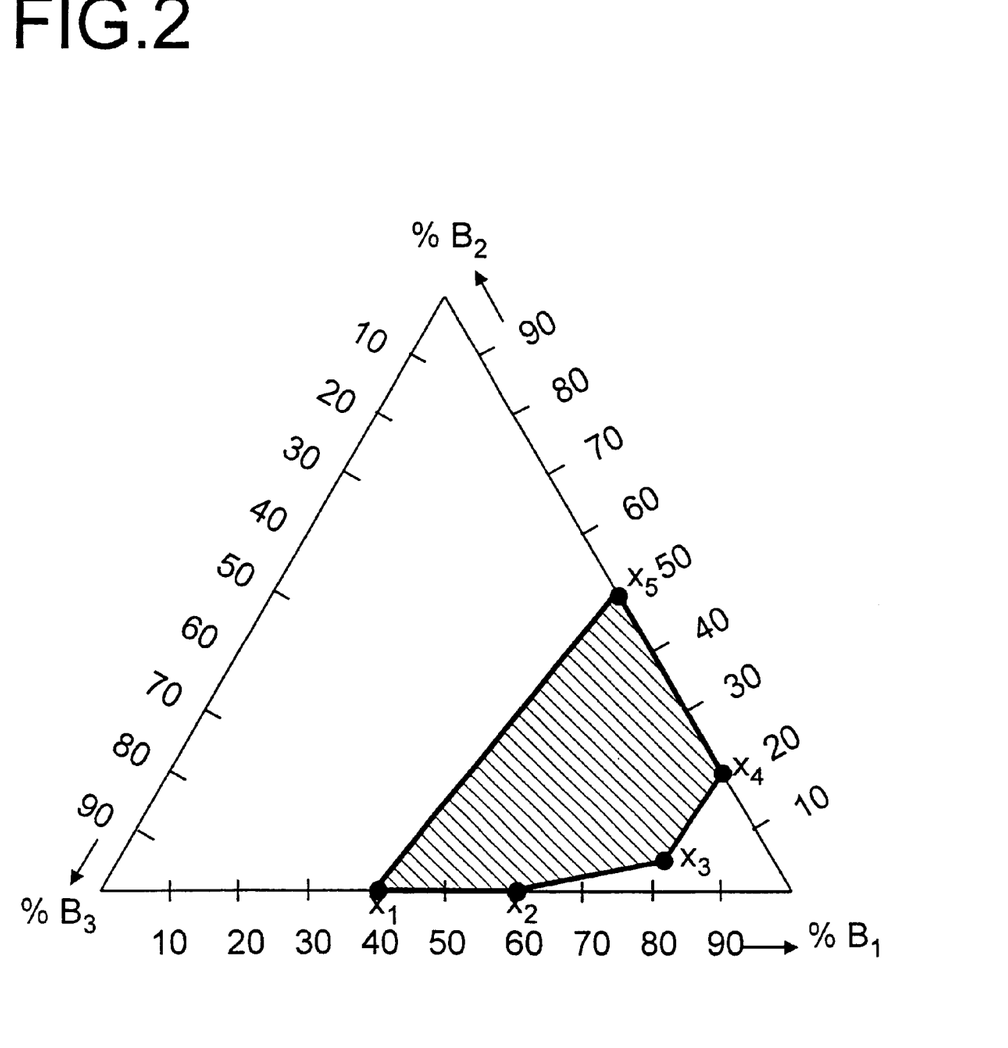
FIG. 2 is a ternary diagram of a polyamide for use in the subject invention.

Preference is given to copolyamides whose composition in a ternary diagram is within the pentagon defined by the corner points $X_1$ to $X_5$ which are each in turn defined as follows:

| | |
|---|---|
| $X_1$ | 40% by weight of units $B_1$) |
| | 60% by weight of units $B_3$) |
| $X_2$ | 60% by weight of units $B_1$) |
| | 40% by weight of units $B_3$) |
| $X_3$ | 80% by weight of units $B_1$) |
| | 5% by weight of units $B_2$) |
| | 15% by weight of units $B_3$) |
| $X_4$ | 80% by weight of units $B_1$) |
| | 20% by weight of units $B_2$) |
| $X_5$ | 50% by weight of units $B_1$) |
| | 50% by weight of units $B_2$) |

The drawing shows the pentagon defined by these points within a ternary diagram (FIG. 2).

Particular advantageousness for many purposes has been found to be possessed by polyamides containing 50–80, in particular 60–75% by weight of units derived from terephthalic acid and hexamethylenediamine (units $B_1$)) and 20–50, preferably 25–40,% by weight of units derived from ε-caprolactam (units $B_2$))

Besides the above-described units $B_1$) to $B_3$), the partly aromatic copolyamides B) may additionally contain minor amounts, preferably not more than 15% by weight, in particular not more than 10% by weight, of further polyamide units of the type known from other polyamides. These units may be derivative from dicarboxylic acids of 4–16 carbon atoms and aliphatic or cycloaliphatic diamines of 4–16 carbon atoms and from aminocarboxylic acids and the corresponding lactams of 7–12 carbon atoms. Suitable monomers of these types are suberic acid, azeleic acid, sebacic acid and isophthalic acid, merely mentioned as representatives of dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane, merely mentioned as representatives of diamines and capryllactam, enantholactam, omega-aminoundecanoic acid and laurolactam, merely mentioned as representatives of lactams or aminocarboxylic acids.

Particular advantageousness has been found to be possessed by partly aromatic copolyamides whose triamine content is less than 0.5, preferably less than 0.3, % by weight.

Most existing processes give partly aromatic copolyamides having triamine contents of above 0.5% by weight, which has an adverse effect on product quality and leads to problems in continuous production. A particular triamine responsible for these problems is dihexamethylenetriamine, which forms from the hexamethylenediamine starting material.

Copolyamides having a low triamine content have lower melt viscosities if compared at the same solution viscosity with products of the same composition but a higher triamine content. This fact has positive effects not only on the processibility but also on the product characteristics.

The melting points of partly aromatic copolyamides B) are within the range from 260° C. to above 300° C., this high melting point also being associated with a high glass transition temperature, generally of more than 75, in particular of more than 85° C. (in the dry state).

Binary copolyamides based on terephthalic acid, hexamethylenediamine and ε-caprolactam have if they contain about 70% by weight of units derived from terephthalic acid and hexamethylenediamine melting points within the range of 300° C. and (in the dry state) a glass transition temperature of more than 110° C.

Binary copolyamides based on terephthalic acid, adipic acid and hexamethylenediamine have melting points of 300° C. or more at even lower levels of about 55% by weight of units from terephthalic acid and hexamethylenediamine (HMD), although the glass transition temperature is not quite as high as in the case of binary copolyamides which contain ε-caprolactam in place of adipic acid or adipic acid/HMD.

The preferred partly aromatic copolyamides of low triamine content can be prepared by the processes described in EP-A-129,195, -129,196 and U.S. Pat. No. 5,252,661.

Component B may be added to resin component (A) by traditional compounding methods known to those skilled in the art and as discussed above with respect to the incorporation of copolymer (A3). Most preferably, component (B) will be mixed with resin component (A) using a twin screw compounding extruder or the equivalent, especially those having a size (screw diameter) of 40 mm or higher. Preferably during the addition of component B to component A, temperatures above the melting temperature of B to a temperature which is lower than the melting temperature of B by 20° C. should be used. According to one aspect it is preferred that during the addition of component B to component A, temperatures not exceed 300° C., more preferably 250° C.

The method and composition of the invention generally require that no more than 20% by weight of the total composition of A+B be comprised of component B. Amounts of component B greater than 20% by weight of the total composition have been found to affect the performance properties of the finished composition, especially with respect to impact properties. Those skilled in the art will appreciate that when the composition of A+B comprises more than 50% B, the main phase becomes B and is no longer a styrene copolymer.

It is desirable that the compositions of the invention have an optimal balance of low gloss and performance properties, especially impact properties. The compositions of the invention will have from 0.1 to 20% of component (B). Preferably, the compositions of the invention will have from 2 to 10% and most preferably from 4 to 8% by weight of component (B), based on the weight of components (A) and (B).

The low gloss styrene compositions of the invention will generally have an average surface gloss reading of from 15 to 45, as measured at 75°. Gloss readings of from 15 to 35 at 75° are most preferred.

The compositions of the invention are further characterized by useful performance properties, especially with respect to impact strength.

Although the compositions of the invention will find use in a variety of applications, they are particularly well suited for use in exterior applications such as siding, window frames and the like. A most preferred use is in a composite suitable for use as exterior siding for a structure.

Figure 1:
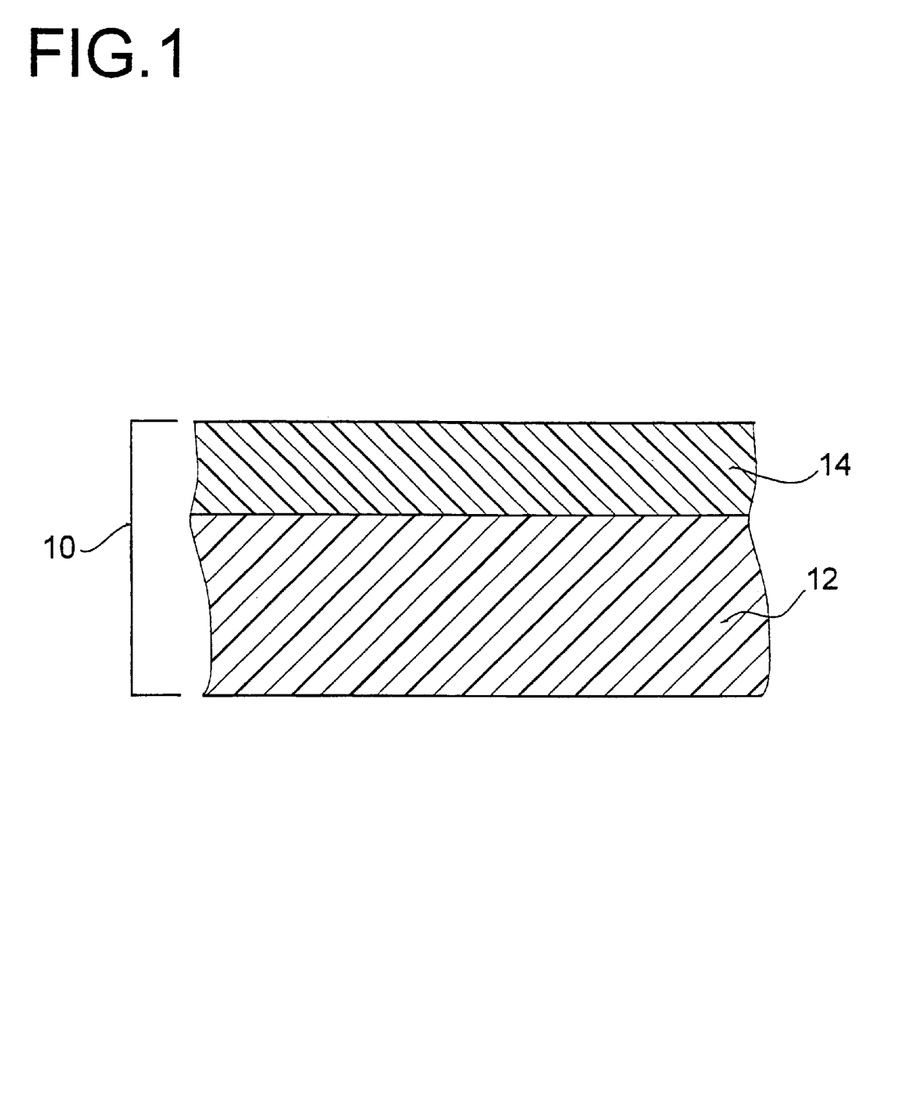
FIG. 1 is an enlarged, partial cross-sectional view of one embodiment of the composite structure of the invention showing a weatherable styrene copolymer exterior layer adhered to a polyvinylchloride (PVC) interior layer.

The composite of the invention has at least one interior layer (I) which is a thermoplastic and at least one exterior layer (II) which includes the weatherable low gloss styrene compositions of the invention. Exterior layer (II) will generally be continuos with and in communication with interior layer (I). Turning to FIG. 1, it can be seen that composite 10 is comprised of interior layer 12 and exterior layer 14. The composite 10 will be used so that interior layer 12 is positioned so as to be protected from exposure to light and weather, i.e., next to the surface of a building or structure, while weatherable layer 14 faces outward toward exposure from light and weather.

Interior layer (I) 12 will be comprised of at least one polymeric layer but may be a multilayer polymeric structure. Layer 12 will generally be comprised of ABS, PVC (poly (vinylchloride)), or mixtures thereof. Preferably, layer (I) will be a PVC substrate such as a rigid (non-plasticized) PVC substrate with or without additives such as impact modifiers (such as CPE, acrylic, styrenic block copolymers); processing aids; thermal and oxidative stabilizers; UV stabilizers; fillers (such as talc, $TiO_2$, calcium carbonate); pigments and recycled products.

Exterior layer (II) 14 will be a styrene composition comprising styrene resin (A) and matting agent (B) according to the instant invention. Most preferably, exterior layer 14 will comprise an ASA resin (A) such as described above and from 4–8 by weight of matting agent (B), based on the weight of (A)+(B).

Interior layer (I) 12 will generally have a thickness of from 10 to 100 mils and preferably from about 25 to 50 mils (0.63 to 1.27 mm).

Exterior layer (II) 14 will generally have an average thickness of from 5 to 15 mils (0.127 to 0.381 mm). Preferably exterior layer 14 will have an average thickness of from 5 to 10 mils (0.127 to 0.254 mm).

It will be appreciated that the thickness of both layers 12 and 14 will vary as a result of the coextrusion process. For example, layer 14 may typically show film thickness ranging from 7 mils to 11 mils (0.178 to 0.279 mm), with an average film thickness of approximately 9 mils (0.229 mm).

The composite of the invention will be formed by coextruding techniques such as are well known to those skilled in the art. Exterior layer 12 and interior layer 14 will be simultaneously extruded in the form of mono or multilayer sheets such that layer 12 is continues with and in communication with layer 14.

The coextrusion process of the composite of the invention will preferably take place at temperatures less than 450° F. (250° C.). Most preferably the composite of.the invention will be extruded at temperatures of between 320 and 400° F. (178 to 222° C.)

Alternatively the parts can be formed from the styrene copolymer compositions according to the invention by injection molding. Thereby it is preferred to use injection molding temperatures of above the melting temperature of A and below the melting temperature of the matting agent B.

The following examples are intended to illustrate but not limit the invention.

EXAMPLE 1

A traditional gloss styrene copolymer composition for use as a control ("Control ASA resin") was prepared by adding approximately 2.6% titanium dioxide (Kronos 2220) to BASF Corporation's commercially available LURAN® S 797 SE UV ASA resin (a UV-stabilized, high impact ASA resin with an E-Modul of appr. 2000 MPa, determined according to DIN 53457).

A low gloss styrene copolymer composition according to the instant invention ("Low Gloss ASA resin") was prepared by adding approximately 2.6% titanium dioxide (Kronos 2220) and 4.6% of BASF Corporation's ULTRADUR® B2550 PBT resin (polybutyleneterephthalate with a viscosity number of 107 ml/g, determined according to DIN 53728) to BASF Corporation's commercially available LURAN® S 797 SE UV ASA resin.

Both the Control ASA resin and the Low Gloss ASA resin were prepared using a twin screw extruder to incorporate the $TiO_2$ and the PBT.

Test plaques were extruded using a Dorstener Con 2 V conical screw extruder. A blue pigment was dosed into each material during extrusion to simulate colorant systems typically used by the siding industry. Each extruded sheet was about 50 mils in thickness and embossed as typical of PVC siding profiles. The sheets were allowed to cool and gloss measurements recorded at 75° for each temperature profile. The temperature profiles and processing conditions used are listed in Table 1. Twenty panels from each material were extruded. From the twenty panels, five were randomly selected for surface gloss measurements.

TABLE 1

Temperature Profiles and Processing Conditions

| Process Conditions A | | | | | |
|---|---|---|---|---|---|
| Zone #1 | 340 F. | Die Zone #1 | 360 F. | Extruder Motor | 1100 RPM |
| Zone #2 | 340 F. | Die Zone #2 | 360 F. | Feeder Motor | 300 RPM |
| Zone #3 | 340 F. | Embosser Speed | 3.5 | Back Pressure | 3.9–4.1 |
| Oil | 330 F. | Puller Speed | 15 | Stock Temperature | 382 F. |

TABLE 1-continued

Temperature Profiles and Processing Conditions

Process Conditions B

| Zone #1 | 370 F. | Die Zone #1 | 390 F. | Extruder Motor | 1100 RPM |
|---|---|---|---|---|---|
| Zone #2 | 370 F. | Die Zone #2 | 390 F. | Feeder Motor | 300 RPM |
| Zone #3 | 370 F. | Embosser Speed | 3.5 | Back Pressure | 3.2–3.5 |
| Oil | 360 F. | Puller Speed | 15 | Stock Temperature | 406 F. |

Process Conditions C

| Zone #1 | 400 F. | Die Zone #1 | 420 F. | Extruder Motor | 1100 RPM |
|---|---|---|---|---|---|
| Zone #2 | 400 F. | Die Zone #2 | 420 F. | Feeder Motor | 300 RPM |
| Zone #3 | 400 F. | Embosser Speed | 3.5 | Back Pressure | 3.0–3.2 |
| Oil | 390 F. | Puller Speed | 15 | Stock Temperature | 433 F. |

Process Conditions D

| Zone #1 | 430 F. | Die Zone #1 | 450 F. | Extruder Motor | 1100 RPM |
|---|---|---|---|---|---|
| Zone #2 | 430 F. | Die Zone #2 | 450 F. | Feeder Motor | 300 RPM |
| Zone #3 | 420 F. | Embosser Speed | 3.5 | Back Pressure | 2.4–2.6 |
| Oil | 420 F. | Puller Speed | 15 | Stock Temperature | 459 F. |

The results are summarized in Table 2.

TABLE 2

Gloss as a Function of Processing Conditions

| Process Condition A 340° F. | Gloss | Process Condition B 370° F. | Gloss | Process Condition C 400° F. | Gloss | Process Condition D 430° F. | Gloss |
|---|---|---|---|---|---|---|---|
| *Control ASA resin, Gloss of Selected Panel Vs. Processing Temperature* | | | | | | | |
| Panel #1 | 29.1 | Panel #1 | 35.6 | Panel #1 | 47.3 | Panel #1 | 48.6 |
| Panel #5 | 30.3 | Panel #5 | 32.2 | Panel #5 | 46.9 | Panel #5 | 51.9 |
| Panel #10 | 31.3 | Panel #10 | 35.4 | Panel #10 | 44.7 | Panel #10 | 55.5 |
| Panel #15 | 32.3 | Panel #15 | 35.8 | Panel #15 | 47.7 | Panel #15 | 52.1 |
| Panel #20 | 31.1 | Panel #20 | 36.8 | Panel #20 | 43 | Panel #20 | 55.8 |
| Average Gloss | 30.82 | Average Gloss | 35.16 | Average Gloss | 45.92 | Average Gloss | 52.78 |
| *Low Gloss ASA resin, Gloss of Selected Panel Vs. Processing Temperature* | | | | | | | |
| Panel #1 | 24.8 | Panel #1 | 18 | Panel #1 | 18.9 | Panel #1 | 47.6 |
| Panel #5 | 25.1 | Panel #5 | 18.9 | Panel #5 | 19.5 | Panel #5 | 49.9 |
| Panel #10 | 25.6 | Panel #10 | 18.4 | Panel #10 | 19.7 | Panel #10 | 51.6 |
| Panel #15 | 23.8 | Panel #15 | 19.8 | Panel #15 | 20.3 | Panel #15 | 54 |
| Panel #20 | 27.5 | Panel #20 | N/A | Panel #20 | 19.3 | Panel #20 | 52.3 |
| Average Gloss | 25.36 | Average Gloss | 18.78 | Average Gloss | 19.54 | Average Gloss | 51.08 |

The surface gloss of the low gloss styrene copolymer composition according to the invention was minimized at the two processing temperatures representative of the processing temperatures used by the siding industry. Accordingly, the low gloss styrene copolymer composition is advantageous.

EXAMPLES 2 TO 6 AND COMPARATIVE EXAMPLE C1

A traditional gloss styrene copolymer composition was used as a control ("ASA resin"). It was composed of 48 parts of a crosslinked polybutylacrylate rubber (particle size, 0.5 μm, monodisperse) grafted with styrene and acrylonitrile and 52 parts of a polystyrene-acrylonitrile-copolymer (PSAN 1) with 33 parts of acrylonitrile and a viscosity number of 80 ml/g measured as a 0.5 percent solution in dimethylformamide.

Except for the Ultradur B 2550 the following matting agents were used:

| Polyclear ®RT 51: | Polyethylene terephthalate (PET) resin from Hoechst company, with a viscosity number of 76 ml/g according to ISO 1628 (measured in 0.5% strength solution in phenol/dichlorobenzene (1:1) |
|---|---|
| Ultramid ®A3: | Polyamid 6.6 from BASF Corporation, with a viscosity number according to DIN 53727 of 143 $cm^3$/g (measured in 0.5% strength solution in sulfuric acid) |
| Ultramid ®T3: | Polyamide, 6.6T from BASF Corporation, with a viscosity number of 130 ml/g according to DIN 53727 (measured in 0.5% strength solution in sulfuric acid) |
| Ultramid ®A15: | Polyamid 6.6 from BASF Corporation, with a viscosity number of 80 ml/g according to DIN 53727 (measured in 0.5% strength solution in sulfuric acid) |

90 parts of the control ASA product was mixed in a ZSK 30 extruder from the company Werner und Pfleiderer with 10 parts of the following polymers at the following temperatures as shown in Table 3.

TABLE 3

| | Extruder Temperature ° C. | | | |
|---|---|---|---|---|
| Matting agent | Zone 1 | Zone 2–8 | Zone 9 | Extruder Head |
| Ultradur B2550 | 180 | 230 | 220 | 240 |
| Ultramid A3 | 180 | 265 | 250 | 265 |
| Polyethylene terephthalate | 180 | 265 | 250 | 265 |
| Ultramid T | 180 | 300 | 285 | 300 |
| Ultramid A 15 | 180 | 265 | 250 | 265 |

The products prepared as shown above were then injection molded at the different temperatures shown below to discs with a diameter of 60 mm and a thickness of 2 mm. Using a Dr. Lange Reflectometer, the gloss of the discs (reflected light) was measured at an angle of 60° normal to the surface according to DIN 67530 (Table 4).

TABLE 4

| Exp. No. | Injection Molding Temperature (Form Temperature 30°) | | | | | matting agent (T-melt[2]) |
|---|---|---|---|---|---|---|
| | 220° C. | 245° C. | 250° C. | 280° C. | 300° C. | |
| | | | | Gloss %[1] | | |
| C1 | 88 | n.m. | 91 | 91 | n.m. | none |
| 2 | 61 | n.m. | 83 | n.m. | n.m. | 10% Ultradur B2550 (223° C.) |
| 3 | 12 | n.m. | * | 90 | n.m. | 10% Ultramid A3 (260° C.) |
| 4 | 27 | * | n.m. | 91 | n.m. | 10% PET (250° C.) |
| 5 | 13 | n.m. | 26 | 28 | 88 | 10% Ultramid T3 (295° C.) |
| 6 | 13 | n.m. | 26 | 86 | n.m. | 10% Ultramid A15 (260° C.) |

[1]Measured at an angle of 60°.
[2]Crystalline melting temperature (T° C.), measured using DSC, rate of heating, 10° C./minute).
nm not measured.
*Disc surface contained molding lines, no reproducible measurements possible.

As can be seen particularly matted products were obtained where the injection molding temperatures were lower than the melting temperature of the matting agent.

EXPERIMENTS 7 TO 10 AND COMPARATIVE EXAMPLE C2

In a further set of experiments, the following components were mixed in a ZSK 30 extruder under the same conditions as described in Table 3:

| 62.5 | parts of the control ASA product; |
|---|---|
| 32.5 | parts of a PSAN 1; |
| 5 | parts of 20% carbon black batch in PSAN 1; |
| 7 | parts of the matting agent. |

These compounds were then extruded on a single screw extruder at 230° C. (Barmag, screw diameter 45 mm, length of screw 25D) to 0.7 mm sheets which were then vacuum formed at a temperature of 150° C. The gloss was measured at an angle of 60° on the top and bottom sides of the extruded sheets, before and after vacuum forming. The results are given in Table 5.

TABLE 5

| Exp. No. | Matting Agent | Gloss (%) of Extruded Sheet | | Gloss (%) of Vacuum Formed Sheet | |
|---|---|---|---|---|---|
| | | Top Side | Bottom Side | Top Side | Bottom Side |
| C2 | none | 79 | 66 | 87 | 84 |
| 7 | 7 parts PET | 30 | 44 | 30 | 24 |
| 8 | 7 parts Ultramid A3 | 11 | 11 | 10 | 9 |
| 9 | 7 parts Ultramid A15 | 29 | 27 | 26 | 21 |
| 10 | 7 parts Ultramid T3 | 11 | 9 | 9 | 9 |

We claim:

1. A composition consisting essentially of
  (A) a styrene resin consisting of the polymerization product of
    (a) one or more monomers (A1) selected from styrene, alpha-methylstyrene, acrylonitrile, and mixtures thereof, wherein at least one of said monomers (A1) is styrene or alpha-methylstyrene,
    (b) an elastomeric rubber (A2) comprising the polymerization product of one or more monomers (A2') selected from alkyl acrylates having form 1 to 8 carbon atoms in the alkyl group, acrylic ester of tricyclodecenyl alcohol, and mixtures thereof, and
    (c) a polymer (A3) consisting of the polymerization product of one or more monomers selected from styrene, alpha-methylstyrene, acrylonitrile, and mixtures thereof, and
  (B) a matting agent consisting of polyalkyleneterephthalates, polyalkylenenaphthalates, polyamides, or mixtures thereof, wherein said matting agent is partially crystalline and is present in an amount of from 0.1 to 20% by weight, based on the total weight of the composition.

2. The composition of claim 1, wherein said matting agent (B) is a polyamide selected from polyamide 6.6., partially aromatic copolyamides containing
  $B_1$) 20 to 90% by weight based on the total weight of the composition of units derived from terephthalic acid and hexamethylenediamine, whereby up to 10% by weight based on the total weight of the composition of the total aromatic dicarboxylic acids used, can be replaced by isophthalic acid or other aromatic dicarboxylic acids,
  $B_2$) up to 50% by weight based on the total weight of the composition of units derived from ε-caprolactam and
  $B_3$) by weight based on the total weight of the composition of units derived from adipic acid and hexamethylenediamine whereby the sum of the weight percentages of B1 to B3 is 100, polyalkyleneterephthalates and polyalkylenenaphthalates.

3. The composition of claim 2, wherein said matting agent (B) is present in an amount of from 2 to 10% by weight, based on the total weight of the composition.

4. The composition of claim 2, having a gloss between 15 to 45 at 75°.

5. The composition of claim 1, wherein said matting agent (B) is selected from polybutyleneterephthalate, polyethyleneterephthalate and polyethylenenaphthalate.

6. The composition of claim 5, wherein said matting agent (B) is present in an amount of from 2 to 10% by weight, based on the total weight of the composition.

7. The composition of claim 5, having a gloss of between 15 to 45 at 75°.

8. The composition of claim 1, wherein said matting agent (B) is present in an amount of from 2 to 10% by weight, based on the total weight of the composition.

9. The composition of claim 8, having a gloss of between 15 to 45 at 75°.

10. The composition of claim 1, having a gloss of between 15 to 45 at 75°.

11. A composite comprising
  (I) at least one interior layer comprising a thermoplastic, and
  (II) at least one exterior layer comprising a composition consisting essentially of
    (A) a styrene resin consisting of the polymerization product of
      (a) one or more monomers (A1) selected from styrene, alpha-methylstyrene, acrylonitrile, and mixtures thereof,
      (b) an elastomeric rubber (A2) comprising the polymerization product of one or more monomers (A2') selected from alkyl acrylates having form 1 to 8 carbon atoms in the alkyl group, acrylic ester of tricyclodecenyl alcohol, and mixtures thereof, and (c) a polymer (A3) consisting of the polymerization product of one or more monomers selected from styrene, alpha-methylstyrene, acrylonitrile, and mixtures thereof, and (B) a matting agent consisting of polyalkyleneterephthalates, polyalkylenenaphthalates, polyamides, or mixtures thereof, wherein said matting agent is partially crystalline and is present in an amount of from 0.1 to 20% by weight, based on the total weight of the composition, wherein exterior layer (II) is continuous and coextensive with interior layer (I).

12. A method of reducing the surface gloss of a styrene copolymer composition, consisting essentially of the steps of:

(A) providing a styrene resin (A) consisting of the polymerization product of (a) one or more monomers (A1) selected from styrene, alpha-methylstyrene, acrylonitrile, and mixtures thereof, wherein at least one of the monomers (A1) is styrene or alpha-methylstyrene, (b) an elastomeric rubber (A2) comprising the polymerization product of one or more monomers (A2') selected from alkyl acrylates having form 1 to 8 carbon atoms in the alkyl group, acrylic ester of tricyclodecenyl alcohol, and mixtures thereof, and (c) a polymer (A3) consisting of the polymerization product of one or more monomers selected from styrene, alpha-methylstyrene, acrylonitrile, and mixtures thereof, and (B) adding to the styrene resin (A) a matting agent (B) consisting of polyalkyleneterephthalates, polyalkylenenaphthalates, polyamides, or mixtures thereof, wherein said matting agent is partially crystalline and is present in an amount of from 0.1 to 20% by weight based on the total weight of the composition, at a temperature which is 20° C. below the melting temperature of (B) or higher.

* * * * *